(12) United States Patent
Kline (10) Patent No.: US 6,444,723 B1
(45) Date of Patent: Sep. 3, 2002

(54) CROSSLINKED MICELLAR GEL COMPOSITION

(75) Inventor: Steven R. Kline, Germantown, MD (US)

(73) Assignee: The United States of America as represented by the Secretary of Commerce, Washington, DC (US)

( * ) Notice: Subject to any disclaimer, the term of this patent is extended or adjusted under 35 U.S.C. 154(b) by 22 days.

(21) Appl. No.: 09/640,662

(22) Filed: Aug. 18, 2000

Related U.S. Application Data (60) Provisional application No. 60/164,567, filed on Nov. 10, 1999.

(51) Int. Cl.[7] .............................. C08F 2/48; C08F 2/50
(52) U.S. Cl. ................ 522/184; 522/173; 522/178; 522/182; 522/85; 522/84; 522/86; 522/186; 524/458; 524/815; 524/291; 524/460; 526/333
(58) Field of Search ................. 522/184, 84, 174, 522/173, 178, 182, 85, 86, 186; 526/333; 524/458, 291, 460, 815

(56) References Cited

U.S. PATENT DOCUMENTS 5,162,475 A * 11/1992 Tang et al. .................. 526/333
5,429,826 A * 7/1995 Nair et al. ................... 424/501

OTHER PUBLICATIONS

"Polymerization of Rodlike Micelles", published in Langmuir, vol. 15, pp. 2726–2732 (published on the World Wide Web on Mar. 19, 1999 by the American Chemical Society).
"Nanoporous Polymer Have A Thing for Organics", by Elizabeth Wilson, published in Chemical and Engineering News, Feb. 1, 1999, pp. 32 and 33.

* cited by examiner

*Primary Examiner*—James J. Seidleck
*Assistant Examiner*—Sanza McClendon
(74) *Attorney, Agent, or Firm*—Marvin S. Townsend

(57) ABSTRACT

A crosslinked micellar gel composition is comprised of a polymer formed by a reaction between (a) ionic surfactant units which include ionic surfactant molecules, each of which includes a counterion which has a first polymerizable functional group, (b) crosslinking agent molecules, each of which includes two second polymerizable functional groups, and (c) a reaction initiator selected from the group consisting of reaction initiator molecules and ultraviolet light radiation, wherein the reaction initiator initiates a reaction between a plurality of the ionic surfactant units with each other and a plurality of the ionic surfactant units with the second polymerizable functional groups. The polymer compositions formed from the reactions are crosslinked micellar gels which include a network structure of rodlike micelles forming a soft gel material which retains features and utility of rodlike micelles and benefits from the structural stability of a crosslinked polymer matrix.

20 Claims, 5 Drawing Sheets

CROSSLINKED MICELLAR GEL COMPOSITION

CROSS-REFERENCE TO RELATED APPLICATION

This application claims priority based upon my copending Provisional Application Ser. No. 60/164,567, filed Nov. 10, 1999.

BACKGROUND OF THE INVENTION

1. Field of the Invention

The present invention relates generally to materials used for separating and concentrating solutes and, more particularly, to micellar materials for used for carrying out separating and concentrating functions.

2. Description of the Prior Art

One approach to the separation and concentration of solutes from solvents involves the employment of surfactants. Surfactants are two-part molecules with one part hydrophilic (the "head", often charged) and the other part hydrophobic (the "tail", typically a hydrocarbon). In aqueous solution, surfactants aggregate into structures called micelles wherein the hydrophobic tails cluster together, and expose only their hydrophilic heads to the aqueous solution. These micelles are comprised of approximately 100 individual surfactant molecules that form a dynamic micellar aggregate with a typical diameter of 5 nm. The micelles are often colloidal in nature.

Oily or hydrophobic materials are readily solubilized in the hydrophobic core of the-surfactant micelles. The hydrophobic core provides an energetically favorable environment for solubilizing the oily molecules. In contrast, the hydrophilic head, water, and other polar solvents have unfavorable interaction energies with hydrophobic materials. Since the micelle is not a covalently bonded structure, the individual molecules are free to move, so that large quantities of hydrophobic solutes (with substantially no size restrictions on the individual solutes) can be accommodated by the hydrophobic core.

Some of the difficulties presented by surfactant micelles are their small size (5 nm) and their dynamic character. Due to their extremely small size and their colloidal nature, the micelles and material solubilized therein cannot be removed easily from solution by sedimentation, filtration, or any other comparable physical separation methods. In view of the problems associated with the small size of surfactant micelles, it would be desirable if a micellar material were provided that has macroscopic dimensions.

Their dynamic character also presents problems. The stability (and solubilization capacity) of a surfactant aggregate is highly sensitive to its chemical and physical environment. Slight changes in temperature, salt concentration, or solvent composition can instantly dissolve the aggregates and release their solubilized material. Despite these limitations, the surfactant industry is still a multi-billion dollar/year industry. In view of the problems associated with the dynamic character of surfactant micelles, it would be desirable if a micellar material were provided that has stable micellar properties even when experiencing from slight to substantial changes in its chemical and physical environment.

Although not "prior art" in the present case, the present inventor is the author of the published article entitled "Polymerization of Rodlike Micelles", published in Langmuir, Volume 15, pages 2726–2732 (published on the World Wide Web on Mar. 19, 1999 by the American Chemical Society). The experiments reported therein confirm that the counterion polymerization procedure discussed hereinbelow produces extremely stable cylindrical micelles with a well-defined cross section. The article also includes a complete description of the experimental procedures used for the preparation, and the details of the modeling of small-angle neutron scattering (SANS) data, also presented hereinbelow. The polymerized micelles described in the article are fluid, not solid.

The above-mentioned article by the present inventor states that, in the prior art, a large variety of surfactants and surfactant aggregate structures have been polymerized, with varying levels of success in retaining the original structure. Surfactant structures have been polymerized in the form of spherical micelles, lamellae, and hexagonal arrays of cylinders. Other than in liquid-crystalline phases, rodlike micelles have not been polymerized, although elongated structures have been proposed as the polymerization product of globular micelles. In view of the above, it would be desirable if micellar material were provided that includes rodlike micelles in a polymerized aggregate structure, that is in a solid phase and that is useful in material separation procedures.

In another published article entitled "Nanoporous Polymer Have A Thing For Organics", by Elizabeth Wilson, published in Chemical and Engineering News, Feb. 1, 1999, pages 32 and 33, there is a disclosure of three dimensional, crosslinked cyclodextrin-based polymers which can remove compounds such as trichloroethylene from water. These cyclodextrin-base polymers have hydrophobic pores whose sizes can range from 5 to 11 Angstroms. The cyclodextrin-based polymers are formed from closed-ring cyclodextrin which has a specific molecular size and structure. As a result, the cyclodextrin-based polymers have hydrophobic absorption properties which are fundamentally based upon the molecular size and structure of cyclodextrin. Moreover, it is noted that cyclodextrin is not a surfactant, does not have a head and a tail, and does not have positive and negative ends such as found in a surfactant. Because of the wide range of absorption versatility provided by surfactants having a head and a tail and having positively and negatively charged portions, it would be desirable if a three dimensional, crosslinked material were provided which is based upon a network of ionic surfactants.

Thus, while the foregoing indicates it to be well known to use materials to separate hydrophobic solutes from other materials, the prior art described above does not teach or suggest a crosslinked micellar gel composition which has the following combination of desirable features: (1) provides a micellar material that has macroscopic dimensions; (2) has stable micellar properties even when experiencing from slight to substantial changes in its chemical and physical environment; (3) includes rodlike micelles in a polymerized aggregate structure, that is in a solid phase and that is useful in material separation procedures; and (4) provides a three dimensional, crosslinked material which is based upon a network of ionic surfactants. The foregoing desired characteristics are provided by the unique crosslinked micellar gel composition of the present invention as will be made apparent from the following description thereof. Other advantages of the present invention over the prior art also will be rendered evident.

SUMMARY OF THE INVENTION

To achieve the foregoing and other advantages, the present invention, briefly described, provides a composition that is comprised of a polymer formed by a reaction between (a) ionic surfactant units which include ionic surfactant molecules, each of which includes a counterion which has a first polymerizable functional group, (b) crosslinking agent molecules, each of which includes two second polymerizable functional groups, and (c) a reaction initiator selected from the group consisting of reaction initiator molecules and ultraviolet light radiation, wherein the reaction initiator initiates a reaction between a plurality of the ionic surfactant units with each other and a plurality of the ionic surfactant units with the second polymerizable functional groups. The polymer composition formed from the reaction is comprised of ionic surfactant micelles which are rodlike in shape.

The ionic surfactant units can consist essentially of ionic surfactant molecules, such that the ionic surfactant units form homopolymer units which react with the crosslinking agent.

Alternatively, the ionic surfactant units can further include co-monomer molecules each of which includes a third polymerizable functional group. The first polymerizable functional groups of the ionic surfactant molecules react with the third polymerizable functional groups of the co-monomer molecules to form co-polymer units, and the reaction initiator initiates a reaction between a plurality of the co-polymer units and the crosslinking agent to form the crosslinked micellar gel composition. It is contemplated that the solubilization capacity of the crosslinked micellar gel composition that is formed can be enhanced by the co-polymer units. That is, in the co-polymer units which are comprised of the ionic surfactant molecules and the co-mononer molecules, the co-monomer molecules (such as styrene) may act as as a spacer between the polymerized counterions of the ionic surfactant molecules, allowing the micellar segments to swell to a larger radius and to solubilize a larger total quantity of hydrophobic material for a given volume of crosslinked micellar gel composition.

The first polymerizable functional group of the ionic surfactant counterions can be a first vinyl group. The crosslinking agent molecules can include two second vinyl groups. The co-monomer molecules can include styrene molecules, and the third polymerizable functional group can be a third vinyl group. The reaction initiator molecules can be free-radical initiator molecules.

More specifically, the ionic surfactant molecules can include cetyltrimethylammonium-vinylbenzoate (CTVB), and the crosslinking agent molecules can include divinyl benzene. The free-radical initiator molecules can include 2,2'-azobis[2-(2imidazolin-2-yl) propane] dihydrochloride.

The crosslinked micellar gel composition is a new material that is capable of solubilizing hydrophobic solutes at a molecular level such as is accomplished by conventional surfactant micelles. The new material has the solubilization capacity of a molecular-based surfactant micelles, and, in addition, has the distinct advantage of being crosslinked into a macro-micelle of macroscopic dimensions that is easy to physically handle, and thus separate the solute-absorbing macro-micelle from solution. In this way the crosslinked micellar gel composition can be used in separation processes. Also, the crosslinked micellar gel composition can be pre-loaded with a specific solute that can then be allowed to diffuse out of the gel in a controlled manner.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

It is therefore an object of the present invention to provide a crosslinked micellar gel composition which has many of the advantages of the prior art and few of the disadvantages.

A further object of the present invention is to provide a crosslinked micellar gel composition which provides a micellar material that has macroscopic dimensions.

Still another object of the present invention is to provide a crosslinked micellar gel composition that has stable micellar properties even when experiencing from slight to substantial changes in its chemical and physical environment.

Yet another object of the present invention is to provide a crosslinked micellar gel composition which includes rodlike micelles in a polymerized aggregate structure, that is in a solid phase and that is useful in material separation procedures.

Even another object of the present invention is to provide a crosslinked micellar gel composition that provides a three dimensional, crosslinked material which is based upon a network of ionic surfactants.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and the descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 shows schematic of the structure of the crosslinked micellar gel.

DESCRIPTION OF THE PREFERRED EMBODIMENT

The crosslinked micellar gel composition of the invention is a semi-solid gel comprised of an ionic surfactant that has a polymerized counterion. In aqueous solution, a free-radical initiator polymerizes the counterions, with crosslinking of the micelles achieved by adding divinyl benzene to the micellar solution prior to the initiation of the polymerization. The polymerization is one-step, with the only special requirement being the exclusion of oxygen (or other free-radical inhibitors) from the reaction. The gel, as prepared, conforms to the shape of the reaction vessel or can be cut to size.

Figure 1A:
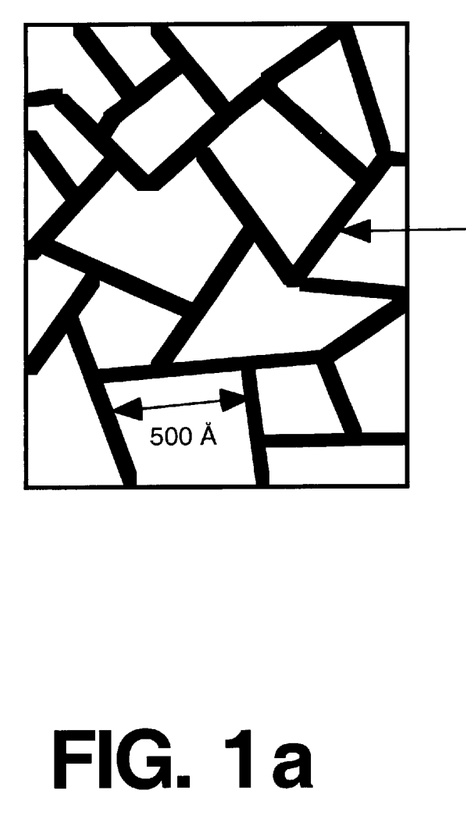
FIG. 1a represents a magnification of the gel, with several hundred Angstroms between crosslinks.
Figure 1B:
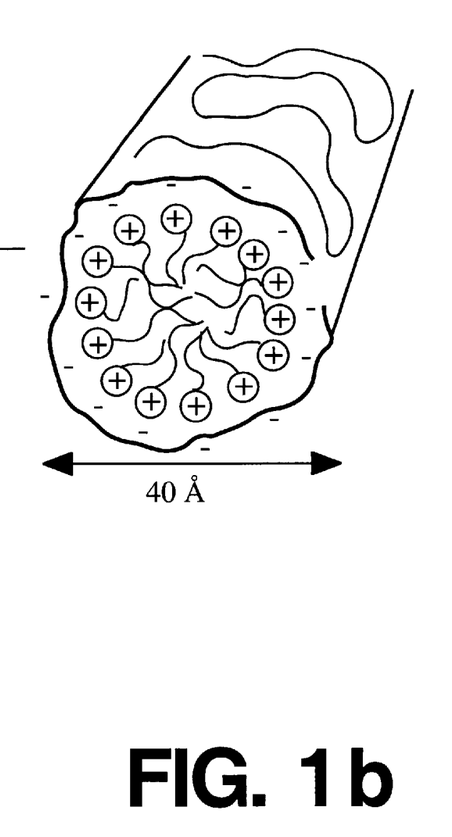
FIG. 1b is further magnification showing that the structural elements between the crosslinks are cylindrical micelles, with a polymerized counterion at the interface.
Figure 2:
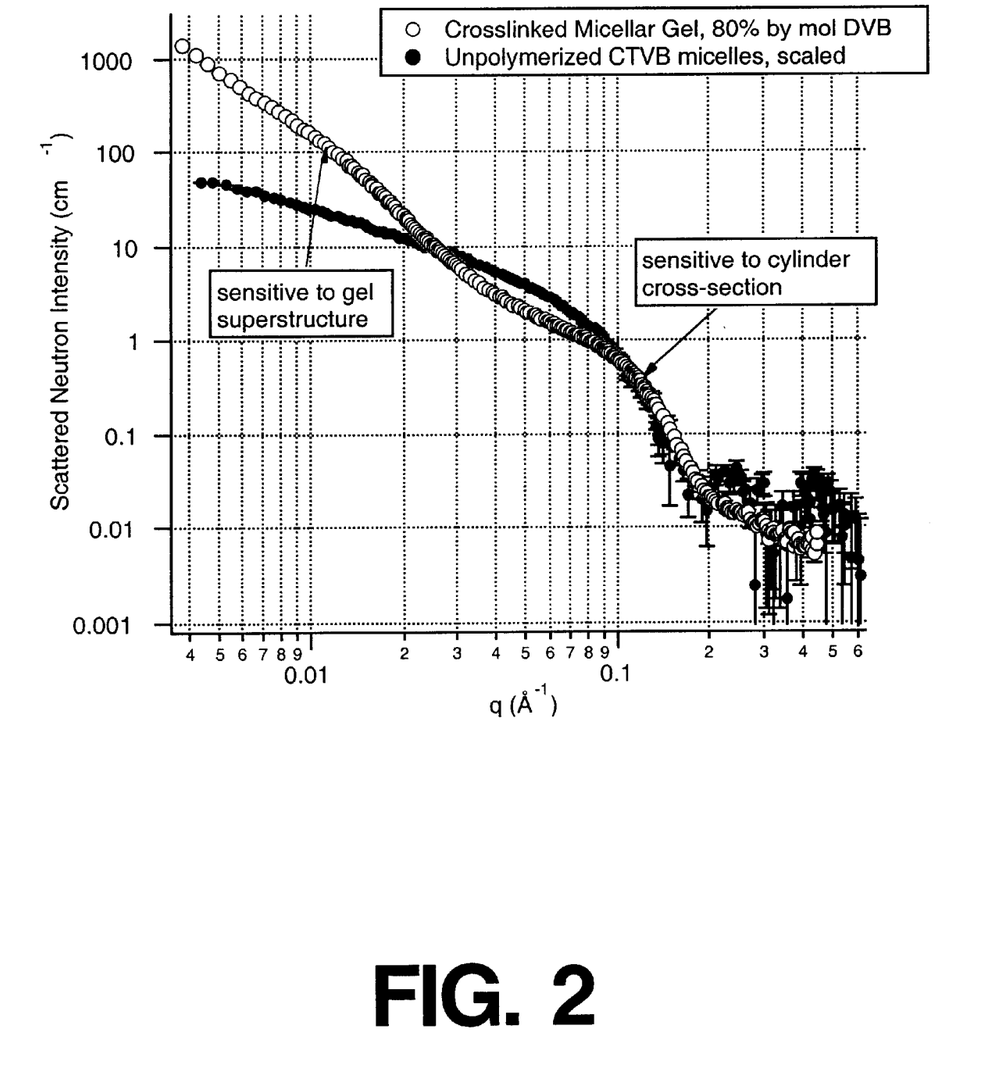
FIG. 2 shows small-angle neutron scattering (SANS) intensity from unpolymerized micelles (solid points) compared to the crosslinked micellar gel. At $q > 0.1$ $A^{-1}$, the scattering curves are nearly identical, indicating that the cylindrical cross-sections are identical. The enhanced scattering at low q from the gel material is indicative of gel superstructure on the length scale of several hundred Angstroms.
Figure 3:
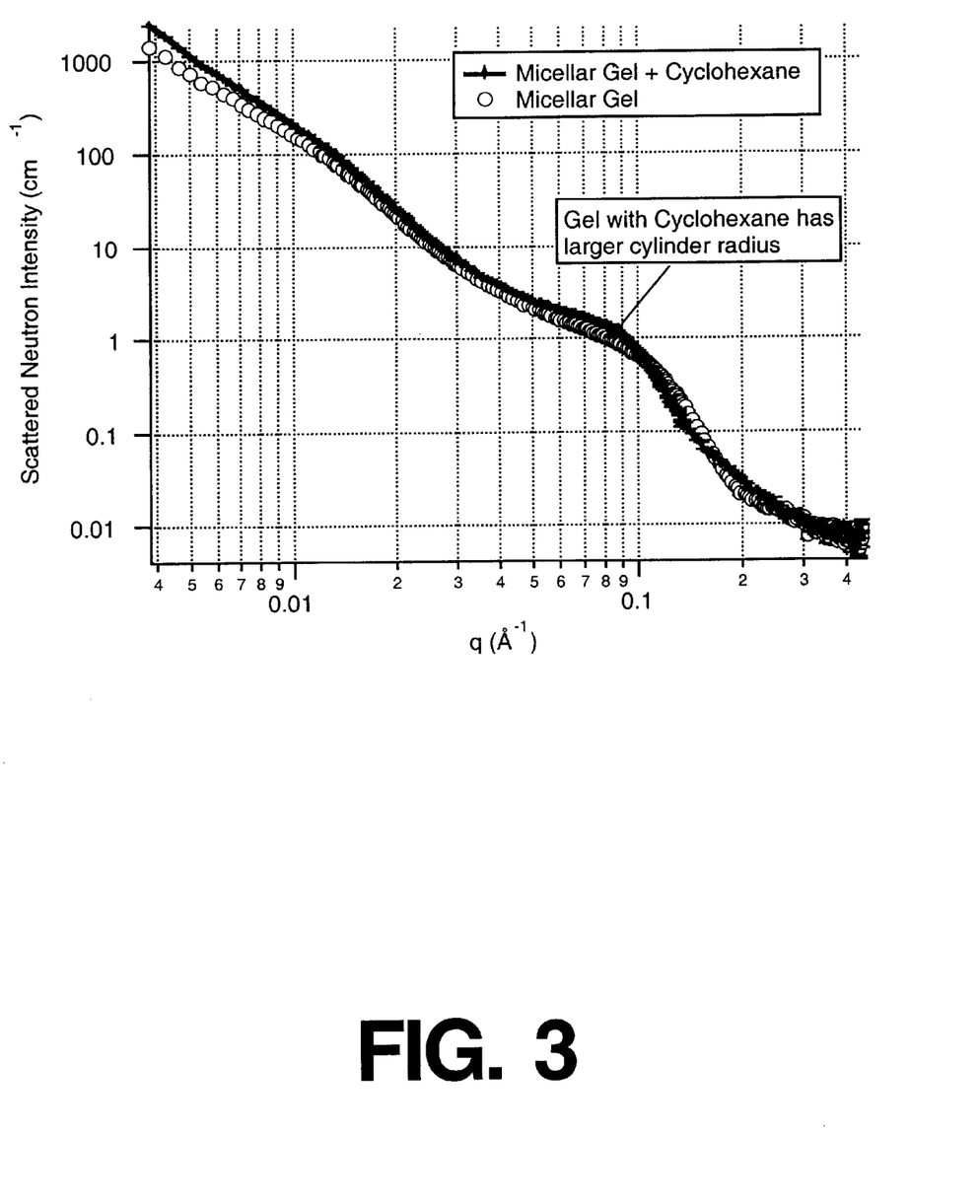
FIG. 3 shows SANS intensity from a crosslinked micellar gel, compared to the same gel after equilibrating with cyclohexane-saturated water. The "break" in the scattering curve indicative of the cylinder cross section occurs at a lower q-value for the cyclohexane-swollen gel, indicating that the cylinder diameter has increased to accommodate cyclohexane molecules. The additional scattering from the cyclohexane-swollen gel over the majority of the q-range is due to the increase in hydrocarbon volume fraction by the solubilized cyclohexane.

A typical preparation of the gel is as follows. A solution of the surfactant cetyltrimethylammonium 4-vinylbenzoate (CTVB) at a concentration of 1% by mass (0.023 mol/l) is prepared in water that has been depleted of oxygen by bubbling with ultrapure nitrogen. To this surfactant solution, an equimolar quantity of divinyl benzene (DVB) is added. The molar ratio of DVB to CTVB can be varied, and a more solid gel is produced as more DVB is added. The solution is equilibrated at 60 degrees C, then the reaction is initiated by adding the free-radical initiator VA-044 (2,2'-azobis[2-(2-imidazolin-2-yl) propane] dihydrochloride) to give a 5% mole fraction of initiator relative to the CTVB concentration. After approximately one hour, the reaction mixture solidifies to a gel, and is allowed to react for 24 hours to ensure complete conversion of monomer. The surfactant tails, the cetyltrimethylammonium ion, are sparingly soluble in water and form cylindrical aggregates with their positively charged headgroups exposed to the aqueous solvent. The negatively charged (4-vinylbenzoate) counterion of the surfactant (now a crosslinked, ionic polymer) is intimately associated with its positively charged surfactant headgroup through ionic interactions and resides at the interface between the hydrophobic core and the aqueous solution. Linear sections of polymer form cylindrical micelles that extend between the physical crosslinks (or branch points) produced by the di-functional crosslinker, divinyl benzene. A schematic of the network structure produced is shown in FIG. 1. The soft gel produced was removed from the reaction vessel, and sliced into uniform disks approximately 1 cm diameter and 0.1 cm thick. The gel slices were stored in deionized water prior to use. The structure of the gel was confirmed by small-angle neutron scattering (SANS), while separate SANS and UV-VIS spectroscopy measurements quantified its solubilization capacity. The structure of the gel as a network of cylindrical micelles was confirmed by SANS, as shown in FIG. 2. The scattered intensity from unpolymerized micelles of CTVB in water (filled points) shows two distinct features. First is the power-law region at low q-values with a slope of $q^{-1}$, characteristic of long cylindrical structures. The second feature is the decrease of the scattering at higher q-values. This "rollover" in the scattering is due to the circular cross-section of the cylindrical micelles. The q-position of this rollover is highly sensitive to changes in the cross-sectional diameter of the micelles. The open points in FIG. 2 are the scattered intensity from a gel of 1% by mass CTVB, crosslinked using 80% by mol of DVB (relative to CTVB). The scattering curve of the unpolymerized micelles has been rescaled to an equivalent surfactant concentration to directly compare with the gel. The high q regions are nearly identical, indicating that the cross-sectional structure and diameter of the micelles have not changed in the gel. The increased scattering at low q from the polymerized micellar gel is from the large network structures present in the gel. The ability of the micellar gel to solubilize hydrophobic solutes was tested by soaking a fresh slice of gel in an aqueous solution that had been saturated with oil. After 24 hours, SANS of the gel was measured and compared to the scattering from the original gel. An example of this is shown in FIG. 3, for a gel that has solubilized cyclohexane. Compared to the original gel (open points), the gel swollen with cyclohexane (solid points) is distinctly different at high q values. The break in the curve from the cylindrical cross section occurs at a lower q-value, indicating that the diameter of the micelles has increased with the addition of cyclohexane. It should be noted that the overall (macroscopic) dimensions of the gel did not increase upon uptake of cyclohexane. The results of detailed modeling to quantify the micelle diameter are listed in Table 1, for the initial gel and several oils. This increase in cylinder volume is converted to the number of moles of oil solubilized per molecule of CTVB in the polymerized gel. These values are listed in Table 1 and can be compared with the solubilization capacity of the same oils in unpolymerized CTVB micelles. The molar capacity of the gel is lower than that of the unpolymerized micelles, possibly due to the physical constraint of the gel structure, or due to incomplete equilibration of the gels with the oils. The results, however, clearly show that a significant amount of oil is incorporated in to the micellar gel, and is of the same order as the original micelles. The most important result is that all of the oil solubilized in the micellar gel can be removed from the water, by physically removing the piece of gel that has solubilized the oil. None of the oil solubilized in the unpolymerized micelles can be removed from the water, since the oil-swollen micelles cannot be separated from the solution.

Somewhat more generally, preparation of the crosslinked micellar gel composition of the invention can result from a polymerization reaction between: the surfactant cetyltrimethylammonium-vinylbenzoate in a range of 1% to 5% by weight; the crosslinker divinyl benzene in a range of 50 mole % to 300 mole %, relative to the cetyltrimethylammonium-vinylbenzoate concentration; and the initiator 2,2'-azobis[2-(2imidazolin-2-yl) propane] dihydrochloride at about 5 mole %, relative to the surfactant concentration. The reaction is carried out at 60 degrees Centigrade for 8 hours.

Table 1 shows solubilization capacity of various oils in the crosslinked micellar as measured by SANS. The amount of crosslinking is the moles of DVB relative to the moles of CTVB (=0.8 for all four samples), and the solubilization capacity is the moles of oil relative to the moles of CTVB.

The solubilization capacity of the unpolymerized micelles is also listed, but may not be a meaningful comparison as discussed in the text.

TABLE 1

| Oil | $R_{cylinder}$ (A) | Crosslinked Gel (mol Oil)/(mol CTVB) | Unpolymerized (mol Oil)/ (mol CTVB) |
| --- | --- | --- | --- |
| None | 19.8(+/−0.5%) | — | — |
| Octane | 20.2 | 0.10(+/−5%) | 0.4(+/−5%) |
| Toluene | 21.7 | 0.48 | 1.0 |
| Cyclohexane | 21.9 | 0.85 | 2.9 |

Figure 4:
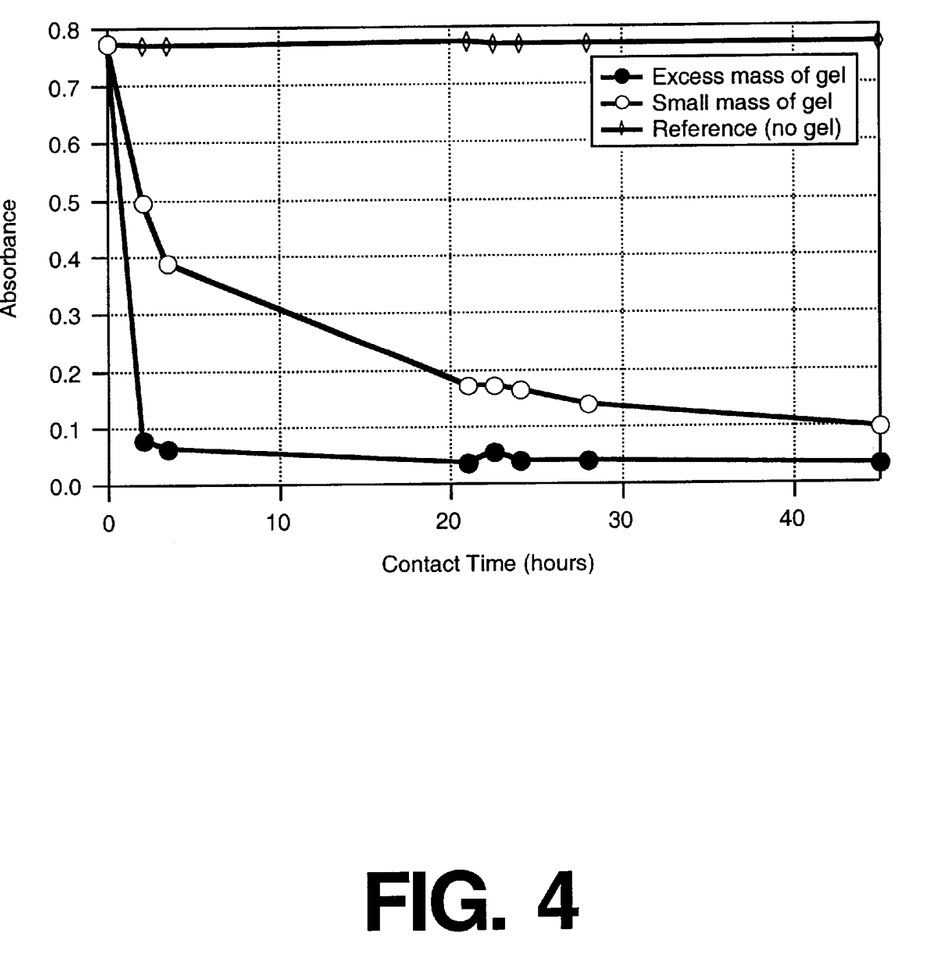
FIG. 4 shows absorbance of supernatant containing methyl orange, as a function of contact time with the crosslinked micellar gel. The absorbance decreases quickly as methyl orange is removed from the supernatant and solubilized in the gel.

The ability of the gels to remove solutes from solution is demonstrated by removing methyl orange (a dye) from aqueous solution. A known concentration of dye was prepared, and a piece of gel was added to the solution. The decreasing concentration of dye in the solution was measured using visible spectroscopy as the micellar gel withdrew the dye from solution. The results of these absorbance measurements are shown in FIG. 4. The absorbance (directly related to the concentration of methyl orange remaining in solution) is shown as a function of time for several initial gel volumes. For a large excess of gel, the dye concentration decreases rapidly. The absorbance value attained is near the detection limit of the instrument, but still indicates that there is essentially no methyl orange remaining in solution. If a smaller piece of gel is added relative to the dye content, equilibrium is reached, and the molar uptake of dye can be calculated as for the oils.

Figure 5:
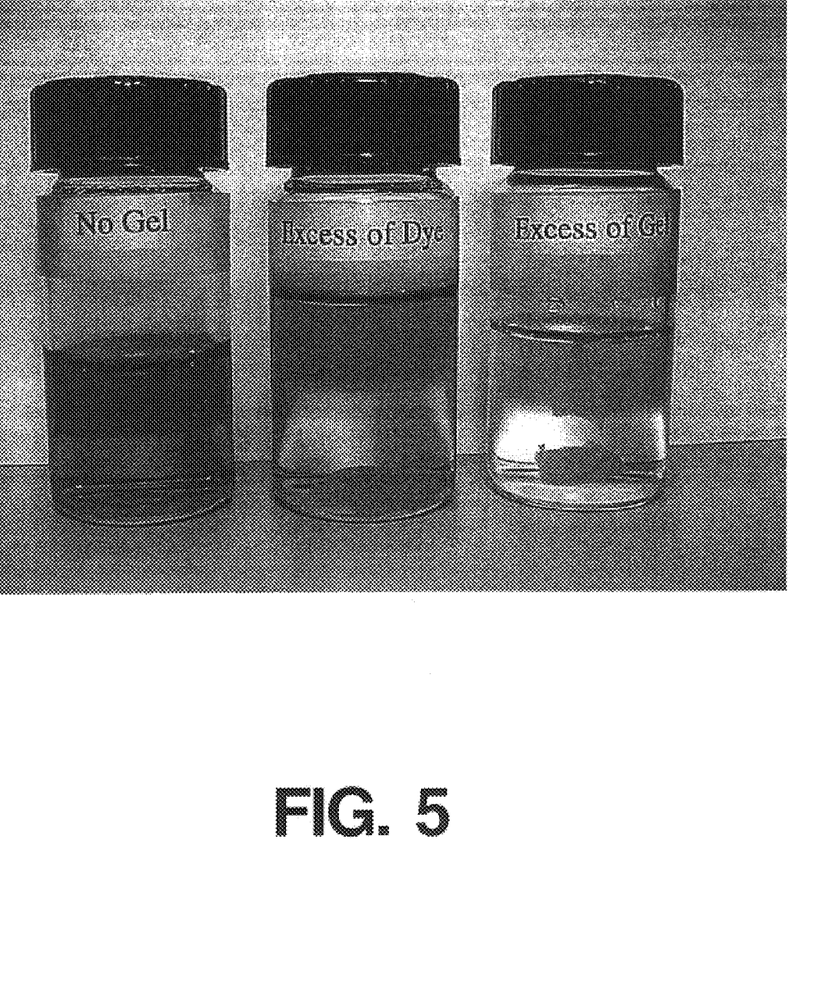
FIG. 5 is a photograph of the three samples of FIG. 4. With no gel, the methyl orange solution is a uniform orange color (the shadows are an artifact of the photograph). When a small amount of gel is added, the dye is depleted from solution, and the gel is saturated with dye. If an excess of gel is added, the dye is concentrated in the gel, and the supernatant is nearly free of dye.

FIG. 5 is a photograph of the samples depicted in FIG. 4, clearly showing how the dye has been removed from solution and incorporated into the crosslinked micellar gel. The numerical results of the dye uptake measurements are shown in Table 2, as a function of the amount of crosslinking, the molar ratio of DVB to CTVB. The lower solubilization capacity of the gels at higher levels of crosslinking is likely due to the increasing rigidity of the gel structure, such that the micelles are not totally free to rearrange their conformation to accommodate the dye molecules. In contrast, adding an unpolymerized surfactant to a solution containing methyl orange would result in the dye being solubilized in the micelles, but the solution would still appear uniform in color. The unpolymerized micelles containing the dye remain uniformly dispersed in solution, with the result that the dye could not be removed from the solution.

Table 2 shows solubilization capacity of methyl orange in the crosslinked micellar gel with varying degrees of crosslinker. The amount of crosslinking is expressed as the moles of DVB relative to the moles of CTVB, and the solubilization capacity is the moles of methyl orange relative to the moles of CTVB.

TABLE 2

| Crosslinking (mol DVB)/(molCTVB) | Solubilization (mol methyl orange)/(mol CTVB) |
| --- | --- |
| 0.5 | 0.52(+/−3%) |
| 0.8 | 0.40 |
| 1.0 | 0.39 |
| 2.0 | 0.33 |
| 3.0 | 0.28 |

Since the crosslinked micellar gel is prepared from small molecular surfactants, it can be considered to be a new type of surfactant. Compared to conventional surfactants, the current invention has the distinct advantage of being macroscopic in size, and does not dissolve in water. The crosslinked micellar gel can solubilize oily solutes nearly as well as conventional surfactants. The advantages of the crosslinked micelles are only realized in specific applications that benefit from the separation of the surfactant micelles from solution. In surfactant applications where it is desired to homogenize oil and water or affect surface properties, conventional surfactants are more appropriate.

Although the crosslinked micellar gel composition described in detail above is a polymer that results from a reaction between the ionic surfactant cetyltrimethylammonium-vinylbenzoate (CTVB), the crosslinking agent divinyl benzene, and the free-radical initiator 2,2'-azobis[2-(2-imidazolin-2-yl) propane] dihydrochloride, the use of other ionic surfactants, other crosslinking agents, and other reaction initiators is contemplated.

Moreover, in general, the crosslinked micellar gel composition of the invention can be formed from addition polymerization and condensation polymerization reactions.

In accordance with the principles of the present invention, the ionic surfactants have a positively charged tail and a negatively charged polymerizable counterion.

Further with respect to the positively charged tail, the positively charged tail can be selected from the group consisting of cetyltrimethylammonium, tetradecyltrimethylammonium, and cetylpyridinium.

Further with respect to the negatively charged polymerizable counterion, the negatively charged polymerizable counterion can be selected from the group consisting of vinyl benzoate and vinyl tosylate.

Generally, the positively charged tail and the negatively charged polymerizable counterion of the ionic surfactants employed with the invention are in salt form, having a positive and a negative ionic component. In this respect, a group of positively charged tails and a group of negatively charged polymerizable counterions can be employed to form respective salts.

Explaining further, conventional surfactants are often sold commercially as a bromide salt. For example, with respect to the conventional surfactant cetyltrimethylammonium bromide, the bromide ion is a negatively charged counterion, which is not polymerizable. On the other hand, polymerizable counterions are sold for example, as a sodium salt, such as sodium vinyl tosylate, sodium being the positive ion in the salt.

With the invention, however, an ionic surfactant that is employed results from combining cetyltrimethylammonium bromide with sodium vinyl tosylate to yield cetyltrimethylammonium vinyl tosylate and sodium bromide. The sodium bromide is removed, leaving the cetyltrimethylammonium vinyl tosylate, which includes a polymerizable counterion.

In addition, an ionic surfactant that can also be employed results from combining cetyltrimethylammonium bromide with sodium vinyl tosylate to yield cetyltrimethylammonium vinyl tosylate and sodium bromide, without removing the sodium bromide. The cetyltrimethylammonium vinyl tosylate can then be polymerized to form the crosslinked micellar gel composition of the invention. The presence of the sodium bromide does not interfere with the production of the crosslinked micellar gel composition. In this respect, a crosslinked micellar gel composition can be prepared by eliminating an earlier preparation step. Furthermore, since the presence of the sodium bromide does not interfere with the formation of the crosslinked micellar gel composition, one may use cheap and relatively impure starting materials. More specifically, although not necessary, simple inorganic salts such as sodium chloride, sodium bromide, potassium chloride, potassium bromide, and similar salts can be present without interfering with the formation of the crosslinked micellar gel composition. The presence of the simple inorganic salts does not interfere with the formation of the crosslinked micellar gel composition because the positively charged tail has a greater affinity for the negatively charged polymerizable counterion than it has for the negative inorganic ion. Conversely, the negatively charged polymerizable counterion has a greater affinity for the positively charged tail than it has for the positive inorganic ion.

In view of the above, it is understood generally that ionic surfactant molecules employed in the invention can be formed by reacting a first salt containing a positively charged tail and a negative inorganic ion with a second salt containing a negatively charged polymerizable counterion and a positive inorganic ion.

Crosslinking agents can be selected from the group consisting of divinyl benzene and ethylene glycol dimethacrylate, among others. In addition, derivatives of the dimethacrylate or divinyl benzene are also contemplated as being suitable crosslinking agents.

Generally, reaction initiators can be free radical initiators which are well known in the art of polymerization chemistry. More specifically, reaction initiators can be selected from the group consisting of azo-type initiators, persulfate initiators (such as potassium persulfate), and peroxide initiators (such as benzoyl peroxide). In addition, ultraviolet light irradiation, though not a molecular entity, can also be used as a reaction initiator.

A wide variety of possible applications of a micellar gel of the invention are contemplated, but only two specific possibilities are listed here. The crosslinked micellar gel composition could have application in separation processes, such as wastewater cleanup where any type of hydrophobic (organic) contaminants could be solubilized in the micellar cores of the gel. The micellar gel can easily be separated from the water and regenerated for re-use.

Another possible application is one of controlled release of hydrophobic materials, such as therapeutic drugs. The micellar gel could be loaded with the drug or other solute that would then diffuse out of the micellar gel matrix at a controlled rate.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a crosslinked micellar gel composition that has macroscopic dimensions. With the invention, a crosslinked micellar gel composition is provided which has stable micellar properties even when experiencing from slight to substantial changes in its chemical and physical environment. With the invention, a crosslinked micellar gel composition is provided which includes rodlike micelles in a polymerized aggregate structure, that is in a solid phase and that is useful in material separation procedures. With the invention, a crosslinked micellar gel composition provides a three dimensional, crosslinked material which is based upon a network of ionic surfactants.

In addition, in the applications where the crosslinked micellar gel composition is used as an adsorbent material for solubilizing organic solutes (such as removing them from wastewater), there are three primary competing materials, and the crosslinked micellar gel composition has advantages over the competing materials. The first competing material is activated carbon which is a non-specific adsorbent that tends to adsorb benign solutes and desorb organics in water. The crosslinked micellar gel composition does not have that tendency to desorb in water.

The second competing material, molecular sieves, filters organic molecules by a mechanism wherein the solute of interest fits into a similar-sized cavity in the molecular sieve. Thus there is no energetic driving force needed to hold the solute to remain in the sieve material. However, individual sieve materials must be synthesized to match to the physical size of a particular solute. With the crosslinked micellar gel composition of the invention, individual compositions do not have to be synthesized to match the physical size of a particular solute.

The third competing material, which is not yet commercialized, is a class of adsorbent polymers based on cyclodextrin. In these materials, there is the same hydrophobic energy associating the organic molecules to the cyclodextrin as there is in the crosslinked micellar gel. However, the cyclodextrin polymers rely on an active cavity where the organic molecules are solubilized (like the sieve materials). This cavity must be synthesized to a specific size, and cannot accommodate molecules larger than a certain size (approximately 1.1 nm). The crosslinked micellar gel composition does not have active pores or cavities, and so is not limited to solutes of a specific size or structure.

Thus, while the present invention has been shown in the drawings and fully described above with particularity and detail in connection with what is presently deemed to be a preferred embodiment of the invention, it will be apparent to those of ordinary skill in the art that many modifications thereof may be made without departing from the principles and concepts set forth herein.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A composition comprising a polymer formed by a reaction between:
    ionic surfactant units which include ionic surfactant molecules each of which includes a counterion having a first polymerizable functional group,
    crosslinking agent molecules each of which includes two second polymerizable functional groups, and
    a reaction initiator selected from the group consisting of reaction initiator molecules and ultraviolet light radiation for initiating a reaction between a plurality of said ionic surfactant units with each other and a-plurality of said ionic surfactant units with said second polymerizable functional groups.

2. The composition of claim 1 wherein said ionic surfactant units consist essentially of ionic surfactant molecules, such that said ionic surfactant units form homopolymer units which react with said crosslinking agent.

3. The composition of claim 1 wherein said ionic surfactant units further include co-monomer molecules each of which includes a third polymerizable functional group, wherein said first polymerizable functional groups of said ionic surfactant molecules react with said third polymerizable functional groups of said co-monomer molecules to form co-polymer units, and wherein said reaction initiator initiates a reaction between a plurality of said co-polymer units and said crosslinking agent.

4. The composition of claim 3 wherein said co-monomer molecules include styrene molecules and said third polymerizable functional group is a third vinyl group.

5. The composition of claim 1 wherein:
said first polymerizable functional group of said ionic surfactant counterions is a first vinyl group,
said crosslinking agent molecules include two second vinyl groups, and
said reaction initiator includes reaction initiator molecules.

6. The composition of claim 1 wherein said reaction initiator molecules are free-radical initiator molecules.

7. The composition of claim 1 wherein said reaction initiator molecules are selected from the group consisting of azo-type initiators, persulfate initiators, and peroxide initiators.

8. The composition of claim 1 wherein said ionic surfactant molecules include a positively charged tail and a negatively charged polymerizable counterion.

9. The composition of claim 8 wherein said positively charged tail is selected from the group consisting of cetyltrimethylammonium, tetradecyltrimethylammonium, and cetylpyridinium.

10. The composition of claim 8 wherein said negatively charged polymerizable counterion is selected from the group consisting of vinyl benzoate and vinyl tosylate.

11. The composition of claim 1 wherein said ionic surfactant molecules are formed by reacting a first salt containing a positively charged tail and a negative inorganic ion with a second salt containing a positive inorganic ion and a negatively charged polymerizable counterion.

12. The composition of claim 11 wherein:
said positively charged tail has a greater affinity for said negatively charged polymerizable counterion than it has for said negative inorganic ion, and
said negatively charged polymerizable counterion has a greater affinity for said positively charged tail than it has for said positive inorganic ion.

13. A composition comprising a polymer formed by reaction between:
ionic surfactant units which include ionic surfactant molecules each of which includes a counterion having a first polymerizable functional group,
crosslinking agent molecules each of which includes two second polymerizable functional groups, and
a reaction initiator selected from the group consisting of reaction initiator molecules and ultraviolet light radiation for initiating a reaction between a plurality of said ionic surfactant units with each other and a plurality of said ionic surfactant units with said second polymerizable functional groups,
wherein said ionic surfactant molecules include a positively charged tail and a negatively charged polymerizable counterion,
wherein said positively charged tail is selected from the group consisting of cetyltrimethylammonium, tetradecyltrimethylammonium, and cetylpyridinium, and
wherein said negatively charged polymerizable counterion is selected from the group consisting of vinyl benzoate and vinyl tosylate.

14. The composition of claim 13 wherein said ionic surfactant molecules are formed by reacting a first salt containing a positively charged tail and a negative inorganic ion with a second salt containing a positive inorganic ion and a negatively charged polymerizable counterion.

15. The composition of claim 14 wherein:
said positively charged tail has a greater affinity for said negatively charged polymerizable counterion than it has for said negative inorganic ion, and
said negatively charged polymerizable counterion has a greater affinity for said positively charged tail than it has for said positive inorganic ion.

16. The composition of claim 13 wherein said reaction initiator molecules include 2,2'-azobis[2-(2-imidazolin-2-yl)propane] dihydrochloride.

17. The composition of claim 13 wherein:
said ionic surfactant molecules include cetyltrimethylammonium 4-vinylbenzoate (CTVB), and
said crosslinking agent molecules include divinyl benzene.

18. The composition of claim 13 wherein:
said ionic surfactant molecules include cetyltrimethylammonium 4-vinylbenzoate (CTVB), and
said crosslinking agent molecules include ethylene glycol dimethacrylate.

19. The composition of claim 13 wherein:
said ionic surfactant molecules include cetyltrimethylammonium 4-vinyl tosylate, and
said crosslinking agent molecules include divinyl benzene.

20. The composition of claim 13 wherein:
said ionic surfactant molecules are formed by reacting a first salt containing a positively charged cetyltrimethylammonium tail and a negative inorganic bromide ion with a second salt containing a positive inorganic sodium ion and a negatively charged polymerizable vinyl tosylate counterion, and
said crosslinking agent molecules include divinyl benzene.

* * * * *